April 17, 1928.

L. P. WILLIAMS

ANCHOR

Filed May 3, 1926

1,666,805

Leonard P. Williams
INVENTOR

BY *Victor J. Evans*

ATTORNEY

WITNESS

Patented Apr. 17, 1928.

1,666,805

UNITED STATES PATENT OFFICE.

LEONARD P. WILLIAMS, OF NEWARK, NEW JERSEY.

ANCHOR.

Application filed May 3, 1926. Serial No. 106,525.

This invention relates to anchorage bolts embodying expansible members adapted to evenly grip the walls of a bore within which the device is applied in order that the latter will be evenly centered and exert a disturbed tension within the bore to prevent splitting.

An object of the invention is to associate cone members with the anchor to facilitate an even tension upon the expansible members.

With the above and other objects in view, the invention further includes the following novel features and details of construction, to be hereinafter more fully described, illustrated in the accompanying drawing and pointed out in the appended claim.

Figure 1:
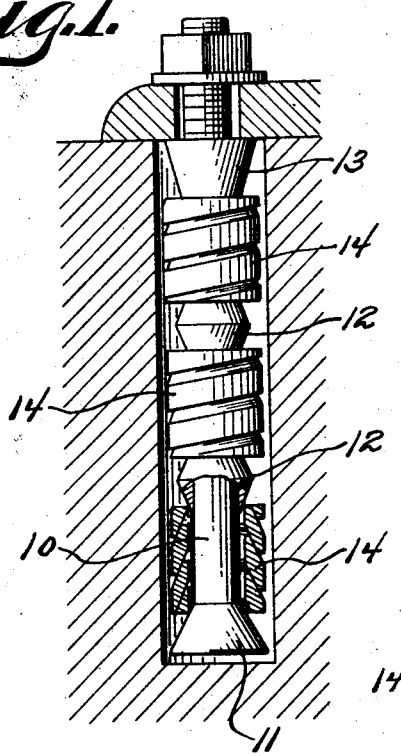
Figures 1 and 2 are elevations of the invention partly broken away and illustrating the operation thereof.
Figure 2:
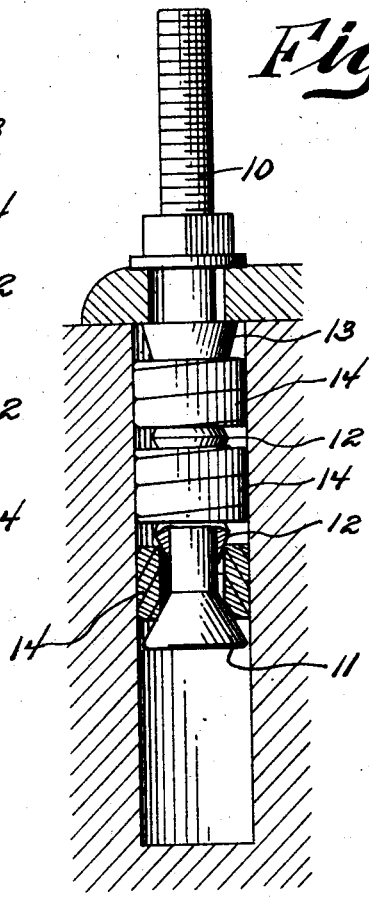
Figure 3:
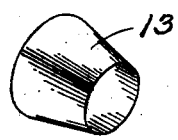
Figures 3, 4 and 5 are perspectives of the cones and expansible member.
Figure 4:
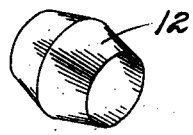
Figure 5:
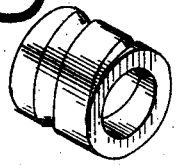

Referring to the drawing in detail, wherein like characters of reference denote corresponding parts, the reference character 10 indicates a bolt threaded for an appreciable portion of its length and providing a tapered head 11 upon one end thereof. Said bolt carries slidingly mounted double frusto-conical shaped members 12 between the tapered head 11 and a single frusto-conical shaped member 13. Spiral springs or expansible members 14 are positioned between the conical shaped members and head 11 of the bolt 10, substantially as illustrated in Figures 1 and 2 of the drawing.

In the use and operation of the present invention the bolt in its entirety is inserted within a bore of a support with the threaded end extending through the foot of an object to be anchored. Subsequently a nut carried upon the outer threaded end of the bolt is fed thereon to raise said bolt an appreciable distance, the frusto-conical shaped members, owing to their sliding mounting upon the bolt will remain within the bore while their inclined faces will be received within the ends of the spiral springs. Such action will in turn expand the spiral springs 14 evenly throughout their tensioned lengths against the side walls of the bore within which the bolt is anchored. Such gripping action will be evenly distributed and thereby overcome the usual disadvantage and difficulties experienced in the use of the tapered expansible bolts.

The invention is primarily applicable in the instance of anchoring the feet of rails, but may be used equally and effectively as well upon like portions of lathes and other shop machinery.

The invention is susceptible of various changes in its form, proportions and minor details of construction, and the right is herein reserved to make such changes as properly fall within the scope of the appended claim.

I claim:—

In combination with a bolt having a tapered head upon one end and a nut upon the other, of a frusto-conical shaped member slidably mounted thereon, spiral springs carried by the bolt member between the head and member, said springs having the companion convolutions thereof tapered for overlapping relation, and double frusto-conical shaped members disposed between the adjacent ends of the springs and in conjunction with the tapered head and frusto-conical shaped members being adapted to compress and expand the springs into engagement with the work for the purpose of anchoring the bolt within the work when the same is retracted and to release the spring compression and allow it to retract from engagement with the work when the bolt is retreated within the nut.

In testimony whereof I affix my signature.

LEONARD P. WILLIAMS.